United States Patent

Meininger et al.

[11] 3,781,168
[45] Dec. 25, 1973

[54] PROCESS FOR PREPARING NAVY-BLUE AND GREY 1:2 CHROMIUM AND COBALT COMPLEX AZO-DYESTUFF MIXTURES FOR NATURAL AND SYNTHETIC POLYAMIDE AND POLYURETHANE FIBRES

[75] Inventors: Fritz Meininger, Frankfurt am Main; Hermann Fuchs, Kelkheim/Taunus, both of Germany

[73] Assignee: Farbwerke Hoechst Aktiengesellschaft vormals Meister Lucius & Bruning, Frankfurt am Main, Germany

[22] Filed: July 31, 1972

[21] Appl. No.: 276,762

[30] Foreign Application Priority Data
Aug. 2, 1971 Germany.................. P 21 38 525.1

[52] U.S. Cl. ......................... 8/26, 8/42 B, 8/42 R, 8/43
[51] Int. Cl. ...................... C09b 45/48, D06p 3/24
[58] Field of Search .................. 8/26, 42 B, 42 R, 8/43, 98, 99

[56] References Cited
UNITED STATES PATENTS
2,674,515  2/1951  Widner et al. ........................... 8/26
3,163,634  12/1964  Conrad ................................... 8/26

*Primary Examiner*—Donald Levy
*Assistant Examiner*—Bruce H. Hess
*Attorney*—Henry W. Koster

[57] ABSTRACT

A process for preparing new navy-blue and grey 1:2-chromium and cobalt complex azo dyestuff mixtures in which, in a single-pot-process, mixture of two water-insoluble o,o'-dihydroxy azo dyestuffs of the general formulae

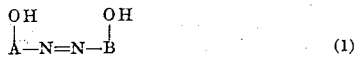

and

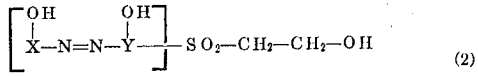

wherein A and X are radicals of diazo components of the benzene series, which may contain non-ionic substituents, B and Y are radicals of coupling components of the naphthalene series which may contain non-ionic substituents, whereby the portion of the dyestuff (2) containing the β-hydroxyethyl sulfonyl group amounts to a maximum of 50 mol-percent, on the condition that the gram atom ratio of chromium to cobalt amounts to 5:1 to 20:1, are chromated and subsequently cobaltated, as well as the dyestuff mixtures obtained by this process which have a very good affinity to natural or synthetic fibres containing nitrogen with very good fastnesses to ligt and to wetting of their dyeings. They also show very good migration properties in the dyeing of the wool, polyamide and polyurethane fibres, so that dyeings having a considerably better levelness are obtained.

They, furthermore, can be more easily wetted and dispersed.

8 Claims, No Drawings

PROCESS FOR PREPARING NAVY-BLUE AND GREY 1:2 CHROMIUM AND COBALT COMPLEX AZO-DYESTUFF MIXTURES FOR NATURAL AND SYNTHETIC POLYAMIDE AND POLYURETHANE FIBRES

The present invention relates to a process for preparing navy-blue and grey 1:2-chromium and cobalt complex azo-dyestuff mixtures for natural and synthetic polyamide and polyurethane fibres. It is known that 1:2-chromium complexes of o,o'-di-hydroxy-azo-dyestuffs free from sulfonic acid groups, which yield on natural or synthetic polyamide fibres navy-blue or grey shades, can be mixed with little portions of 1:2 cobalt complexes of the same or of another monoazo dyestuff in order to achieve the shades desired of the textile dyeing.

For preparing the dyestuff mixtures, the 1:2-chromium and 1:2-cobalt complex dyestuffs may be prepared separately and subsequently mixed. However, the process is not economical because each dyestuff must be prepared by a separate process which requires two apparatuses for the separate preparation processes, more working time etc. This inconvenience does not exist in the case, if mixtures of 1:2-chromium and -cobalt complex dyestuffs of a single monoazo dyestuff are prepared, since in this case the metallization may be achieved in a single-pot-process by using mixtures of the chromating and cobalting agents leading to the shade desired. But this process does not work in the case of mixtures of two o,o'-dihydroxy azo-dyestuffs, which only differ from each other, for example with regard to the structure, of their diazo-component or of their coupling component, since the metallization of the individual dyestuffs proceeds statistically, i.e., from the two different dyestuffs there are formed — by the use of chromating and cobaltating agents — 6 different 1:2-metal complex compounds altogether, namely three 1:2-chromium and three 1:2-cobalt complex dyestuffs, so that it is very difficult to obtain exact shades by the metallization reaction.

It has now been found that new valuable navy blue and grey 1:2-chromium and 1:2-cobalt complex azo-dyestuff mixtures may be prepared by chromating and subsequently cobalting in a single-pot process mixtures of two water-insoluble o,o'-dihydroxy-azo-dyestuffs of the general formulae

and

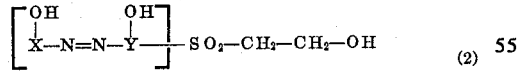

wherein A and X represent radicals of diazo components of the benzene series, which may contain non-ionic substituents, B and Y are radicals of coupling components of the naphthalene series, which may contain non-ionic substituents, the portion of the dye-stuff (2) containing the β-hydroxy-ethyl-sulfonyl group amounting to a maximum of 50 mol percent, for example 33⅓ mol percent, on the condition that the gram atom ratio of chromium to cobalt ranges between 5:1 and 20:1.

The applicability of the process is based on the observation that the metallization of the azo dyestuffs having the mentioned formulae (1) and (2), due to the presence of the substituent —SO$_2$—CH$_2$—CH$_2$—OH in the dyestuff of the formulae (2), does no more proceed statistically, but that the dyestuff of the formula (2) is metallized more quickly with the β-hydroxy-ethyl-sulfonyl group on account of a better hydrophilic behaviour towards the dyestuff of the formula (1); thus, when the first metallization step (chromation) has been completed and the chromium (III) salt has been used up, the remaining dyestuff free from metal is only the monoazo dyestuff of the formula (1), which is reacted with the cobaltation agents added, to form a homogeneous, symmetrical 1:2- cobalt complex; this process makes possible the shades of the 1:2-chromium complex dyestuff.

According to the present process, for example, a mixture of azo dyestuffs consisting of 2 mols of the dyestuff of the formula

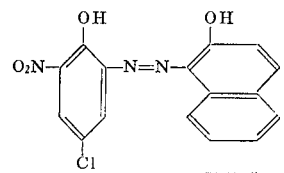

and 1 mol of the dyestuff of the formula

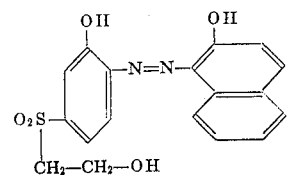

may be metallized at a gram atom ratio of chromium to cobalt as 15:1 or 12:1. Furthermore a mixture of azo dyestuffs consisting of 2 mols of the dyestuff of the formula

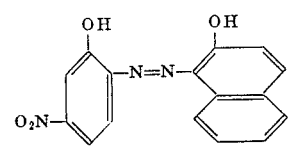

and 1 mol of the dyestuff of the formula

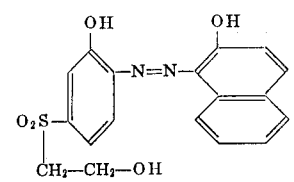

may be metallized according to the invention at a gram atom ratio of chromium to cobalt as 13.5:1.

As diazo components the radicals of which are characterized with A and X in the afore-mentioned formulae (1) and (2), there are considered 2-aminophenol and 2-aminophenols substituted by non-water-solublizing groups, such as 4-chloro, 5-chloro-, 4-nitro-, 4-chloro-5-nitro-, 4,6-dinitro-, 4-methyl-, 4-nitro-6-chloro-, 4-chloro-6-nitro-, 5-nitro-, 4-methoxy-, 5-chloro-4-methoxy-, 5-nitro-4-methoxy-, 4-β-hydroxyethylsulfonyl-, 4-β-hydroxyethylsulfonyl-6-nitro- and 5-β-hydroxyethylsulfonyl-2-aminophenyl.

As coupling components the radicals of which are characterized with B and Y in the afore-mentioned formulae (1) and (2) there are considered for example 2-naphthol, 4-methyl-1-naphthol and 1-naphthol-4- or 5-β -hydroxyethyl sulfone. The monoazo dye-stuffs corresponding to the general formulae (1) and (2) or the mixture of both dyestuffs are prepared according to known methods by diazotizing the afore-mentioned diazo components and coupling with the above-mentioned coupling components. In case that the radicals of the coupling components B and Y are identical, preferably the mixtures of the diazo components are diazotized.

The mixtures of the o,o'-dihydroxy-azo-dyestuffs are reacted in a close vessel in an aqueous suspension with the chromating agent in the pH range of from 4.0 to 6.5 at normal pressure by boiling under reflux, preferably under pressure at 120°–140°C. After the chromating agent has been consumed, the cobaltating agent is added and the metallization is completed at 90°–120°C under normal pressure or under pressure. As chromium (III)-salts there are considered chromium (III)-chloride, chromium (III)-acetate and chromium (III)-formiate, preferably potassium-chromo-sulfate, as cobalt salts there are considered cobalt sulfate, cobalt acetate, cobalt chloride and preferably cobalt carbonate. For neutralizing the mineral acids which may be freed during metallization there is preferably used sodium acetate.

The mixtures of the 1:2-metal complex dyestuffs are obtained as powders difficultly soluble in water, which are finely divided in water by means of known anion-active or non-ionic dispersing and wetting agents or mixtures thereof, for example lignine sulfonates, alkyl naphthalene sulfonates or dinaphthyl methane-sulfonates, addition products of fatty alcohols or fatty acids with alkylene oxide which may be sulfatized or phosphatized. The dyestuff mixtures are used in the form of the aqueous dispersion or the powdered form obtained therefrom by evaporating the water, for dyeing or printing nitrogen-containing textile materials such as wool, polyamide or polyurethane fibres. Another disadvantage is the preparation of solutions of these metal complex dyestuff mixtures in water-miscible organic solvents such as ethyl alcohol, ethylene glycol, diethylene glycol, ethylene glycol monomethyl ether, formamide, dimethyl formide, if desired under addition of the above-mentioned auxiliaries, which solutions may be diluted with water, and the dyestuff remains finely divided in the solution or in the liquid and is directly formed for the dyeing process.

The aqueous dispersions or the powders prepared thereof or the solutions of the dyestuffs prepared according to the present process in organic solvents are introduced into a neutral or slightly acidic aqueous dyebath having a constant or practically constant pH-value, if desired under addition of further dispersing and wetting agents; it is dyed therein, preferably at 70° to 120°C in the presence of auxiliary compounds usual for the dyeing of textile materials containing nitrogen, such as ammonium acetate and quarternary ammonium salts. The pH value of the dyebath may be modified during the dyeing process by adding acid or acidic salts, respectively alkaline agents or alkaline salts, for example by beginning the dyeing process at pH 6.0 and by reducing the pH value to 3.0 at the end of the dyeing process.

The new mixtures of 1:2-chromium and cobalt complex azo-dyestuffs prepared according to the present process yield navy-blue or grey shades. They have a very good affinity to neutral or synthetic fibres containing nitrogen with very good fastnesses to light and to wetting of their dyeings. The dyestuff mixtures obtained according to the invention show very good migration properties in the dyeing of the wool, polyamide and polyurethane fibres as compared with 1:2 metal complex dyestuffs free from β-hydroxyethyl sulfonyl groups, so that dyeings having a considerably better levelness are obtained. Additionally, the dye-stuff mixtures according to the invention possess better physical properties such as a more easy capability to be wetted or dispersed than the simple physical mixtures of the components.

The following examples illustrate the process of prepararation. Parts and percentages are by weight unless stated otherwise.

EXAMPLE 1

A mixture consisting of 57 parts by volume of water, 94 parts of a 96 percent sulfuric acid and 27.6 parts of benzoxazolone-6-β-oxyethyl sulfone was heated for 6 hours under reflux until the formation of $CO_2$ was finished. The solution of the 2-amino-phenol-5-β-oxyethyl sulfone was mixed with 37.7 parts of 4-chloro-5-nitro-2-aminophenol, 100 parts of ice and 1 part of sodium chloride and diazotized while stirring by pouring slowly 60 parts by volume of a 5N-sodium nitrate solution under the liquid surface. Stirring was continued for 2 hours, the nitrate reaction being positive, the nitrous acid in excess was decomposed with a little amount of amidosulfonic acid and the pH value of the diazo suspension was adjusted to 4.0 with concentrated sodium hydroxide solution. After cooling with ice to 10°–15°C, the mixture was slowly introduced to a solution stirred vigorously, consisting of 43.2 parts of 2-naphthol and 30 parts by volume of a 33 percent by weight sodium hydroxide solution in 150 parts by volume of water. The pH value of the coupling mixture was adjusted to 12 – 12.5, if if desired. Stirring was continued for 6 hours.

Then the pH value was adjusted to 4.5 with concentrated hydrochloric acid, the dyestuff mixture was suction-filtered and washed with water. The mixture consisted of two dyestuffs of the formulae

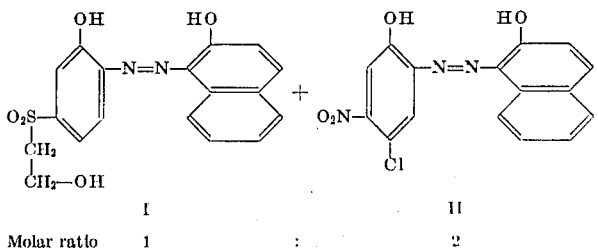

Molar ratio    1    :    2

70.5 Parts of a crystallized potassium chromo-sulfate and 82 parts of crystallized sodium acetate in 750 parts by volume of water were introduced into an enamel autoclave, the moist dyestuff mixture from the first reaction step was added and heated for 4 hours while stirring to 128° – 130°C; an interior pressure of 2.9 atmospheres gauge was obtained. The mixture was cooled to 95°C, mixed with 1.15 parts of cobalt carbonate (47.5 percent of cobalt) and refluxed for one hour. The metal complex dyestuff mixture was suction-filtered, freed from electrolytes with water and dried. The black dyestuff powder contained the symmetrical 1:2 chromium complexes of the above-mentioned dye-stuffs I (blue grey) and II (blue), the non-symmetrical 1:2-chromium complex from I and II (blue) and as a homogeneous component for the shades the symmetrical 1:2-cobalt complex of the dyestuff II (violet). Dyed on wool or polyamide fibres from an aqueous dispersion, a navy-blue dyeing having very good fastnesses to light and to wetting were obtained.

EXAMPLE 2

27.6 Parts of benzoxazolone-6-$\beta$-oxyethylsulfone were refluxed for 6 hours in 57 parts by volume of water and 94 parts of a 96 percent sulfuric acid, until the formation of $CO_2$ was finished. The solution of the 2-aminophenol-5-$\beta$-oxyethyl sulfone was mixed with 100 parts of ice and 1 part of sodium chloride and diazotized by introducing 20 parts by volume of a 5N sodium nitrite solution.

39.8 Parts of 4.6-dinitro-2-aminophenol were stirred with 27 parts of a 33 percent sodium hydroxide solution for 4 hours in 400 parts by volume of water, mixed with 40 parts by volume of sodium nitrite solution 5N, cooled with 700 parts of ice to 0° – 5°C and mixed quickly with 105 parts of hydrochloric acid having a one-half concentration. The two diazo suspensions were mixed with a small amount of amidosulfonic acid for decomposing nitrous acid in excess, adjusted to pH 4.5 with 33 parts of sodium hydroxide solution and introduced slowly, while stirring well, to a solution containing 43.2 parts of 2-naphthol and 30 parts by volume of a 33 percent by weight sodium hydroxide solution in 150 parts by volume of water.

The pH-value of the coupling mixture was adjusted, if desired, to 12 – 12.5. After four hours, the solution was acidified to pH 4.0 with concentrated hydrochloric acid, suction-filtered and washed; and the moist filter residue, which consisted of the two monoazo-dyestuffs of the formulae

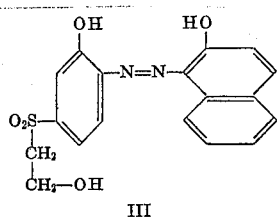

III and

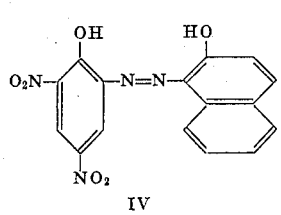

IV having a molar ratio of 1 : 2, was introduced in an enamel autoclave into a solution of 67.5 parts of crystallized potassium chromo-sulfate and 80 parts of crystallized sodium acetate in 750 parts by volume of water. Within 3 hours the whole was heated to 130°C (interior pressure of 2.9 atmosphere gauge), cooled to 90°C, mixed with 1.95 parts of cobalt carbonate (47.5 percent of cobalt) and heated for 1 hour to 125°C. The metal complex dyestuff mixture was suction-filtered, freed from electrolytes with water and dried.

The black dyestuff powder contained the symmetrical 1:2-chromium complexes of the dyestuffs III (blue-grey) and IV (grey), the non-symmetrical 1:2-chromium complex of III and IV (grey) and as a homogeneous component for the shades, the symmetrical 1:2-cobalt complex of the dyestuff IV (reddish grey).

On wool or polyamide fibres, a neutral grey dyeing with a very good fastness to light and to wetting was obtained from an aqueous dispersion.

EXAMPLE 3

21.7 Parts of 1-aminophenol-4-$\beta$-oxyethyl sulfone, 30.8 parts of 5-nitro-2-aminophenol and 75 parts of concentrated hydrochloric acid were heated in 450 parts by volume of water to 80°C, mixed with 300 parts of ice and diazotized by introducing 60 parts by volume of 5N-sodium nitrate solution. Stirring was continued for one hour, the nitrate reaction being positive and the mixture was mixed with a little amount of amidosulfonic acid, in order to destroy nitrous acid in excess, and the pH value of the diazo salt suspension was adjusted to 4.5 with a 33 percent sodium hydroxide solution. The whole was slowly introduced into a vigorously stirred solution of 43.2 parts of 2-naphthol and 30 parts by volume of a 33 percent by weight sodium hydroxide solution in 200 parts by volume of water and 200 parts of ice. The pH-value of the coupling mixture was adjusted to 12.0 with sodium hydroxide solution 33 percent and stirred for 5 hours. Then the mixture was acidified with concentrated hydrochloric acid to pH 3.5, the dyestuff mixture consisting of the two following single dyestuffs

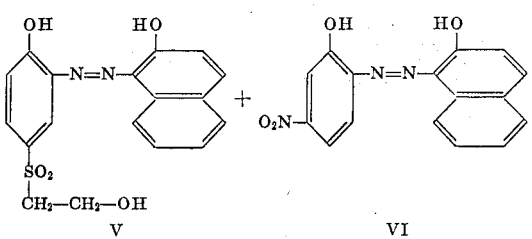

| | V | | VI |
|---|---|---|---|
| Molar ratio | 1 | : | 2 | was suction-filtered and washed with water. The moist filter residue was introduced in an enamel autoclave into a solution of 69 parts of crystallized sodium acetate in 750 parts by volume of water and heated while stirring for 5 hours to 128° – 130°C (interior pressure of 2.9 atmosphere gauge). Then the mixture was cooled to 90°C, mixed with 3.5 parts of crystallized cobalt sulfate and 4 parts of crystallized sodium acetate and heated for 2 hours to 120°C. The mixture of the metal complex dyestuffs was filtered and freed from electrolytes. The 1:2-metal complexes of the monoazo dyestuff V (grey violet) and VI (blue), the asymmetrical 1:2-chromium complex of V and VI (grey) and as a homogeneous portion for the shades, the symmetrical 1:2-cobalt complex of the monoazo dyestuff VI (voilet). The reddish grey dyeing on wool from an aqueous dispersion had very good properties to light and wetting.

The following Table contains further dyestuffs which were prepared according to the process described.

TABLE

| Example number | Monoazo dyestuff mixture | Gram atom ratio, Cr:Co | Shade on wool |
|---|---|---|---|
| 4 | (structure) molar ratio 1:2 | 15:1 | Grey blue. |
| 5 | (structure) molar ratio 1:2 | 18:1 | Grey. |
| 6 | (structure) molar ratio 1:2 | 18:1 | Blue grey. |
| 7 | (structure) molar ratio 1:2 | 12:1 | Navy blue. |
| 8 | (structure) molar ratio 1:2 | 18:1 | Do. |
| 9 | (structure) molar ratio 1:2 | 15:1 | Grey. |
| 10 | (structure) molar ratio 1:2 | 12:1 | Reddish grey. |

What we claim is

1. A process for preparing new navy-blue and grey 1:2-chromium and cobalt complex azo dyestuff mixtures, which comprises chrom-ating and subsequently cobaltating, in a single-pot process, mixtures of two water-insoluble o,o'-dihydroxy-azo dyestuffs of the general formulae

  (1)

and

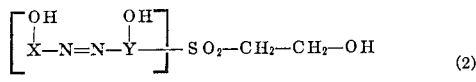  (2)

wherein A and X are radicals of diazo components of the benzene series which may contain non-ionic substituents, B and Y are radicals of coupling components of the naphthalene series which may contain non-ionic substituents, whereby the portion of the dyestuff (2) containing the β-hydroxyethyl sulfonyl group amounts to a minimum of 50 mol-percent, on the condition that the gram atom ratio of chromium to cobalt amounts to 5:1 to 20:1.

2. A process as claimed in claim 1 which comprises treating the mixtures of the two water-insoluble azo dyestuffs in an aqueous suspension with chromating agents in the pH range of from 4.0 to 6.5 by boiling at normal pressure, preferably at 120° to 140° under excess pressure and, after consumption of the chromating agent and subsequently addition of the cobaltating agent, completing metallization at 90°–120°C under normal or excess pressure.

3. A process as claimed in claim 1, in which the portion of the monoazo dyestuff of the formula (2) in the mixture amounts to 33⅓ mol-%.

4. A process as claimed in claim 1, wherein the azo dyestuff mixture consists of 2 mols of the dyestuff of the formula

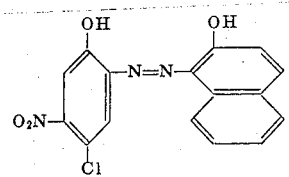

and 1 mol of the dyestuff of the formula

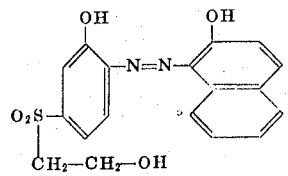

and the gram atom ratio of chromium to cobalt amounts to 15.7:1.

5. A process as claimed in claim 1, wherein the azo dyestuff mixture consists of 2 mols of the dyestuff of the formula

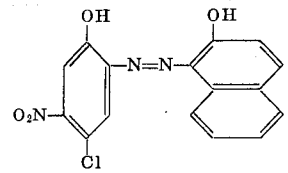

and 1 mol of the dyestuff of the formula

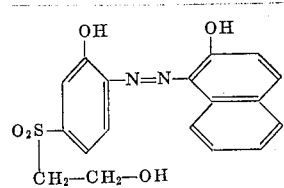

and the gram atom ratio of chromium to cobalt amounts to 12:1.

6. A process as claimed in claim 1, wherein the azo dyestuff mixture consists of 2 mols of the dyestuff of the formula

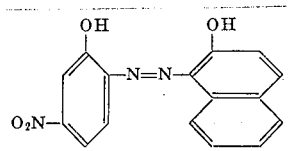

and 1 mol of the dyestuff of the formula

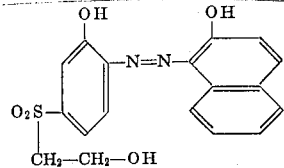

and the gram atom ratio of chromium to cobalt amounts to 13.5:1.

7. The navy-blue and grey 1:2-chromium and cobalt complex azo dyestuff mixtures obtained according to a process as claimed in claim 1.

8. Natural or synthetic textile materials containing nitrogen dyed or printed with the dyestuff mixtures of claim 7.

* * * * *